M. D. GROSS.
CHUTE.
APPLICATION FILED SEPT. 8, 1916.
1,259,227.
Patented Mar. 12, 1918.
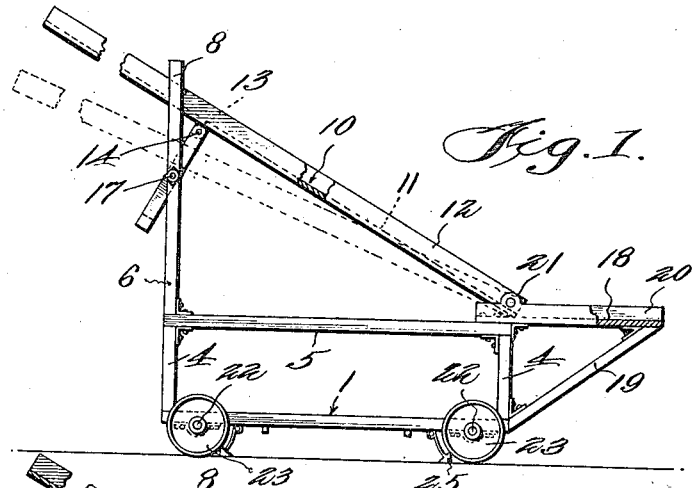
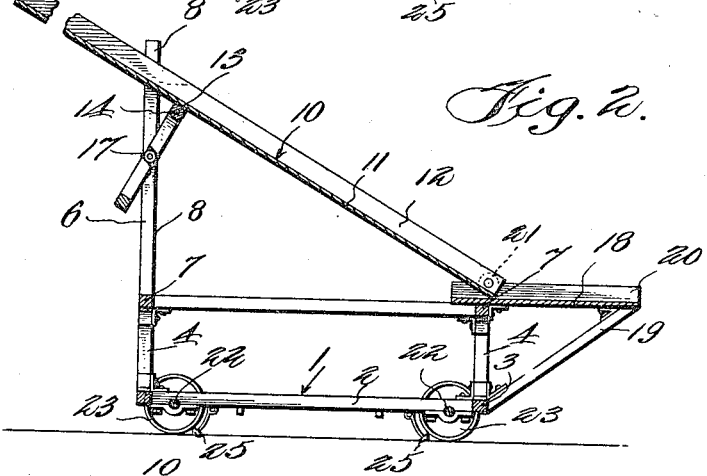
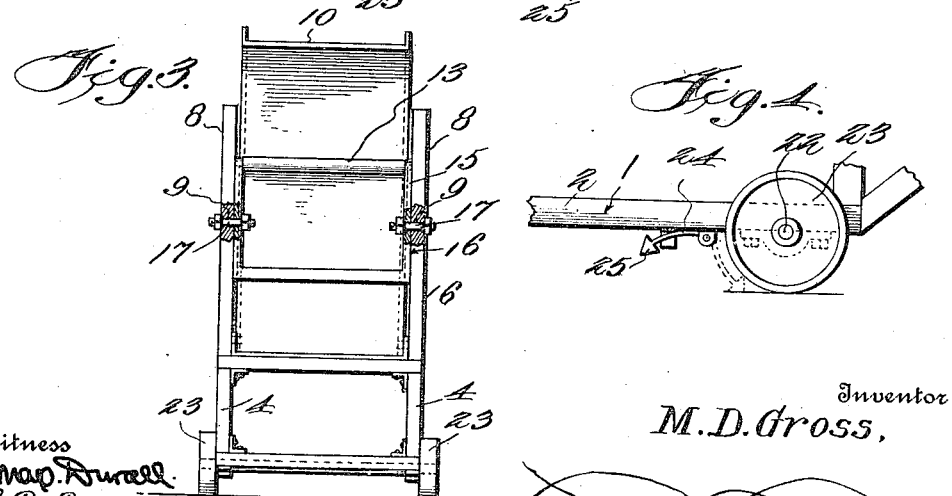
Witness
M. Map. Durrell
H. B. Broas
Inventor
M. D. Gross,
By
Attorney

UNITED STATES PATENT OFFICE.

MILO D. GROSS, OF WALLA WALLA, WASHINGTON.

CHUTE.

1,259,227.  Specification of Letters Patent.  Patented Mar. 12, 1918.

Application filed September 8, 1916. Serial No. 119,105.

*To all whom it may concern:*

Be it known that I, MILO D. GROSS, a citizen of the United States, residing at Walla Walla, in the county of Walla Walla, State of Washington, have invented certain new and useful Improvements in Chutes; and I do hereby declare the following to be a full, clear, and exact description of the invention, such as will enable others skilled in the art to which it appertains to make and use the same.

The present invention is directed to improvements in chutes, and more particularly to chutes for handling sacked grain in grain houses.

The invention has for its object to provide a device of this character which can be conveniently moved from place to place.

A further object of the invention is to provide a portable chute so constructed that it can be tilted to different inclined positions for facilitating the handling of the grain.

With these and other objects in view, this invention resides in the novel features of construction, formation, combination and arrangement of parts to be hereinafter more fully described, claimed and illustrated in the accompanying drawing, in which:—

Figure 1 is a side elevation of the device.

Fig. 2 is a longitudinal sectional view.

Fig. 3 is a rear elevation.

Fig. 4 is a fragmentary view of the wheel brake.

Referring to the drawing 1 designates a frame, which is rectangular in shape and comprises side and end bars 2 and 3, respectively. Supported by the ends of the side bars 3 are vertical bars 4, said bars serving to support the side bars 5 of the upper frame 6, the bars 5 being connected at their ends by end bars 7.

The rear bars 4 terminate at their upper ends in standards 8 which are provided with horizontally alined openings 9, the purpose of which will appear later.

The chute 10 comprises a bottom 11 and sides 12, said bottom being engaged by the roller 13, said roller being carried by the shaft 14 which is supported by the ends of the side bars 15 of the frame 16, said frame having its side bars engaged by bolts 17 so as to pivotally connect the frame to the standards 8 and therebetween.

A platform 18 is provided and has its rear end supported by the forward end of the frame 6, while the outer end thereof is supported by the inclined brace bars 19 the lower ends of which are connected to the forward ends of the frame 1, said platform having side boards 20.

The side boards 20 are provided adjacent their rear ends with ears 21 which have pivotally connected thereto the lower ends of the sides 12 of the chute 10.

Axles 22 are supported by the side bars of the frame 1 and have engaged thereon wheels 23, whereby the device can be moved from place to place.

Pivotally supported by the side bars 2 are hangers 24, said hangers having their lower ends provided with triangular shaped chock-blocks 25 which can be readily positioned with respect to the wheels 23 to prevent the same from rolling, when desired.

By pivotally mounting the frame 16 the same can be swung so that the chute 10 can be supported in different angular relation with the platform 18.

From the foregoing description it will be seen that the device can be rolled from place to place and that grain in sacks can be placed in the chute and will slide to the platform 18.

What is claimed is:—

A chute comprising a wheeled frame, a platform carried by one end of the frame and extending therebeyond, upstanding sides for the platform, spaced uprights carried by the opposite end of the frame from the platform, a chute proper pivotally connected at one end with the sides of the platform and extending between the uprights, a frame pivoted between the uprights below the chute proper and a roller carried by the pivoted frame and engaging the underside of the chute proper to support the latter, said pivoted frame being movable upon its pivots to raise and lower the chute proper upon its pivotal connection with the sides of the platform.

In testimony whereof, I affix my signature, in the presence of two witnesses.

MILO D. GROSS.

Witnesses:
G. S. BOND,
G. B. MARQUIS.

Copies of this patent may be obtained for five cents each, by addressing the "Commissioner of Patents, Washington, D. C."